US006999625B1

(12) United States Patent
Nelson

(10) Patent No.: US 6,999,625 B1
(45) Date of Patent: Feb. 14, 2006

(54) FEATURE-BASED DETECTION AND CONTEXT DISCRIMINATE CLASSIFICATION FOR DIGITAL IMAGES

(75) Inventor: Susan Nelson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 616 days.

(21) Appl. No.: 10/196,388

(22) Filed: Jul. 12, 2002

(51) Int. Cl.
G06K 9/00 (2006.01)
G06K 9/62 (2006.01)

(52) U.S. Cl. .............. 382/224; 382/103; 382/132; 382/228

(58) Field of Classification Search ........... 382/103, 382/132, 224, 228
See application file for complete search history.

(56) References Cited

U.S. PATENT DOCUMENTS 5,787,201 A * 7/1998 Nelson et al. ............ 382/224
5,982,921 A * 11/1999 Alumot et al. ............ 382/145
6,026,174 A * 2/2000 Palcic et al. .............. 382/133
6,493,460 B1 * 12/2002 MacAulay et al. ........ 382/133
6,687,397 B1 * 2/2004 DeYong et al. ........... 382/145
2001/0031076 A1 * 10/2001 Campanini et al. ........ 382/128

* cited by examiner

Primary Examiner—Jingge Wu
Assistant Examiner—Anthony Mackowey
(74) Attorney, Agent, or Firm—James T. Shepherd

(57) ABSTRACT

Detection and classification of targets in a digital image is accomplished by evaluating windowed portions of the image. A feature set is generated for each of a plurality of overlapping windowed portions, a weighted sum is formed for each portion based upon its feature set, and a context matrix is defined for each window. A score is formed from each context matrix and is normalized for each window. A threshold criteria is compared to a maximum score for each window. Each window having its maximum score satisfy the threshold criteria is classified as a possible target window and is assigned to a group based on location of the possible target window and its maximum score. A group score is formed for each group and compared to a group threshold criteria. Each group having its corresponding group score satisfying the group threshold criteria is classified as a target.

17 Claims, 3 Drawing Sheets

FEATURE-BASED DETECTION AND CONTEXT DISCRIMINATE CLASSIFICATION FOR DIGITAL IMAGES

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCE TO RELATED PATENT APPLICATIONS

This patent application is co-pending with two related patent applications entitled "CONTEXT DISCRIMINATE CLASSIFICATION FOR DIGITAL IMAGES" (Navy Case No. 82584) and "FEATURE-BASED DETECTION AND CONTEXT DISCRIMINATE CLASSIFICATION FOR KNOWN IMAGE STRUCTURES" (Navy Case No. 83537), by the same inventor as this patent application.

FIELD OF THE INVENTION

The invention relates generally to digital image processing, and more particularly to the classification of digital images in which image features of windowed portions of the image are detected and then evaluated in context with the image as a whole.

BACKGROUND OF THE INVENTION

While many two-dimensional images can be viewed with the naked eye for simple analysis, many other two-dimensional images (e.g., acoustic, sonar, x-ray, infrared, etc.) must be carefully examined and analyzed. One of the most commonly examined/analyzed two-dimensional images is an x-ray of living beings or inanimate structures. For example, a mammogram is a common film x-ray usually taken with an x-ray machine dedicated to breast imaging. A mammogram usually has low contrast because of the similarity in optical density of breast tissue structures and because only a limited amount of ionizing radiation can be safely received by the patient. The mammogram image also has fairly low resolution due to inherent limits of the x-ray filming process, cost constraints, and the interrelationships of tissue structures in the three-dimensional breast. All of these issues make it difficult to detect breast malignancies, especially in the earliest stages thereof.

Currently, doctors are limited to examining a mammogram by visually examining the original x-ray backed by a light source. The only enhancements available are crude ones such as using a magnifying glass, tweaking the contrast on an image view, or filtering the image by blocking out a range of pixel intensity levels. Statistics indicate that an estimated twenty percent of malignancies present in a mammogram are missed by doctors, usually because they are too small or faint (i.e., low intensity) to be noticed on the initial screening or they were partially obscured by other imaged tissues. Also, the known difficulty of discerning small malignancies forces doctors to take a very conservative approach when reviewing a mammogram. Thus, biopsies are often ordered simply because the mammogram is not clear. However, in about eighty percent of patients sent for biopsy, no malignancy is found. As a result, thousands of unnecessary biopsies are performed each year. Each biopsy represents a risk to the patient and can cause the formation of scar tissue in the area of the biopsy that may obscure detection of future problems.

To aid in the analysis of two-dimensional images, a variety of computerized detection algorithms are being developed. To utilize the algorithm, the image is first digitized for processing purposes. In general, detection algorithms look at small pieces of the digital image to evaluate the possibility of the presence of an abnormality or, more generally, a "target" of interest. However, by looking at the image as a plurality of isolated pieces, detection algorithms are unable to evaluate the pieces in the context of (i.e., relative to) the whole image as a human does when viewing an image. Very often, pieces of the image that might be classified as targets by the detection algorithm are not targets if considered in context with the image as a whole.

SUMMARY OF THE INVENTION

Accordingly, it is an object of the present invention to provide a method of detecting possible targets in an image and then classifying a detected target in an image in the context of the entire image.

Another object of the present invention is to provide a detection and classification scheme that can evaluate the relevance of detected targets in the context of the entire image.

Other objects and advantages of the present invention will become more obvious hereinafter in the specification and drawings.

In accordance with the present invention, a method and system are provided for detecting and classifying targets in a digital image. A feature set is generated for each of a plurality of overlapping windowed portions of an image with each feature being defined by a value indicative of a mathematical measure of a corresponding one of the overlapping windowed portions. A weighted sum is formed for each overlapping windowed portion using the feature set corresponding thereto. Each feature in a feature set and weighted sum associated with each overlapping windowed portion is normalized across the overlapping windowed portions. As a result, a context matrix is defined by a normalized feature set and a normalized weighted sum for each of the overlapping windowed portions. Next, a score is formed using the context matrix for each overlapping windowed portion. This score is normalized for each overlapping windowed portion across all of the overlapping windowed portions. As a result, a normalized score is defined for each overlapping windowed portion. A threshold criteria is compared to a maximum score defined as the maximum of the normalized weighted sum and the normalized score for each overlapping windowed portion. Each overlapping windowed portion having its maximum score satisfy the threshold criteria is classified as a possible target window. The associated maximum score is indicative of a target classification. Each possible target window is next assigned to a group based on location of the possible target window in the image and its maximum score. A group score is then formed for each group using the maximum score associated with each possible target window in the group. Finally, each group score is compared to a group threshold criteria. Each group having its corresponding group score satisfying the group threshold criteria is classified as a target with the group score further being indicative of a target classification.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
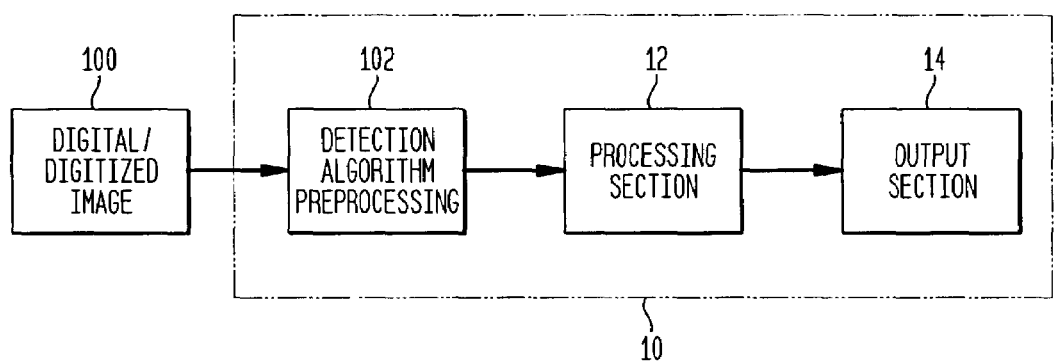
FIG. 1 is a block diagram of an embodiment of a system used to carry out the feature-based detection and context discriminate classification of a digital image in accordance with the present invention.

Referring now to the drawings, and more particularly to FIG. 1, a block diagram is shown of a system 10 for carrying out the present invention. System 10 will be described briefly with details of the digital image detection and classification method implemented thereby being described thereafter. System 10 applies detection algorithm preprocessing 102 to detect possible "targets" in a digital image 100 and then classifies the "targets" in a processing section 12. Classified "targets" can be displayed or otherwise output at an output section 14. The term "targets" as used herein refers to any region of interest in digital or digitized image 100 such as, but not limited to, the following: abnormalities in scans of humans, animals or structures; the presence of targets such as mines in sonar images and electro-optic images; the presence of objects of interest in drug interdiction; the presence of structural defects in pipelines, bridges, or dams; the presence of targets not discernable by the human eye in very opaque images; etc.

Figure 2:
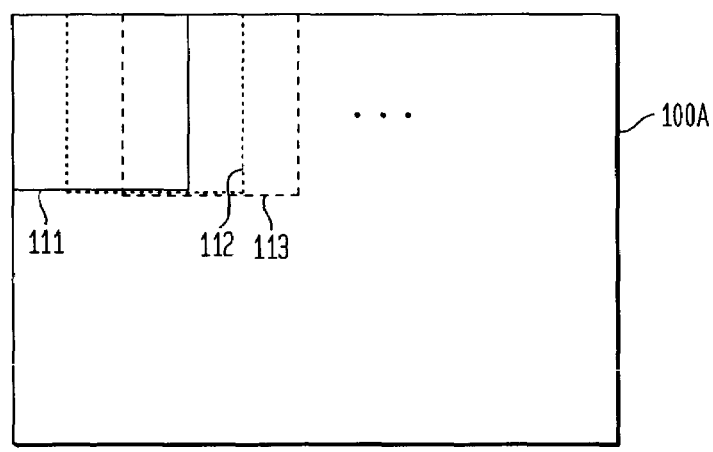
FIG. 2 is a diagrammatic view of an image area divided into overlapping windowed portions.

In general, the output generated by detection algorithm preprocessing 102 is a feature set for each of a plurality of overlapping windowed portions of image 100. This output will be described with the aid of FIG. 2 where an image area 100A (i.e., the actual image representation of digital image 100) is shown. Preprocessing 102 divides image area 100A into overlapping windowed portions, three of which are illustrated. Specifically, window 111 is represented by the solid lines, window 112 is represented by the dotted lines and window 113 is represented by the dashed lines.

Preprocessing 102 performs a number of mathematical calculations on the image portion bounded by each of the overlapping windows. Each mathematical calculation generates a value indicative of a feature or characteristic of the image bounded by the window. Such features include, but are not limited to, the following:

i) First order features that are defined as being independent measurements or measures such as maximum intensity, minimum intensity, average intensity, median intensity and fractal dimension of a target window.

ii) Second order features that are defined as being dependent on more than one measure like the difference between maximum and minimum intensities, the standard deviation that requires the mean and number of samples in the calculation, the measure of least occurring high frequency bins in the whole image that are also present in the target window, a target window flag that identifies a particular histogram structure, a whole window flag that identifies the whole image as one of low, medium or high density, and the difference between a small and large target fractal dimension within the target window.

iii) High order composite features that are based on linear combinations (e.g., sums, differences, etc.) of first, second and higher order features. The particular combinations used can be selected for a given application and are not limitations of the present invention.

As a result of the above-described statistical based detections, preprocessing 102 can be considered to generate a feature set or vector F defining all of the feature values calculated. In terms of the example illustrated in FIG. 2, the feature sets can be written as $F_{111}(f_1, f_2, \ldots, f_N)$
$F_{112}(f_1, f_2, \ldots, f_N)$
$F_{113}(f_1, f_2, \ldots, f_N)$ where each $f_n$, n=1 to N, is representative of a particular image feature. For example, if the feature $f_1$ is maximum intensity, then the value of the maximum intensity of windowed portion 111 is reflected at $F_{111}(f_1)$, the value of the maximum intensity of windowed portion 112 is reflected at $F_{112}(f_1)$, etc.

Figure 3:
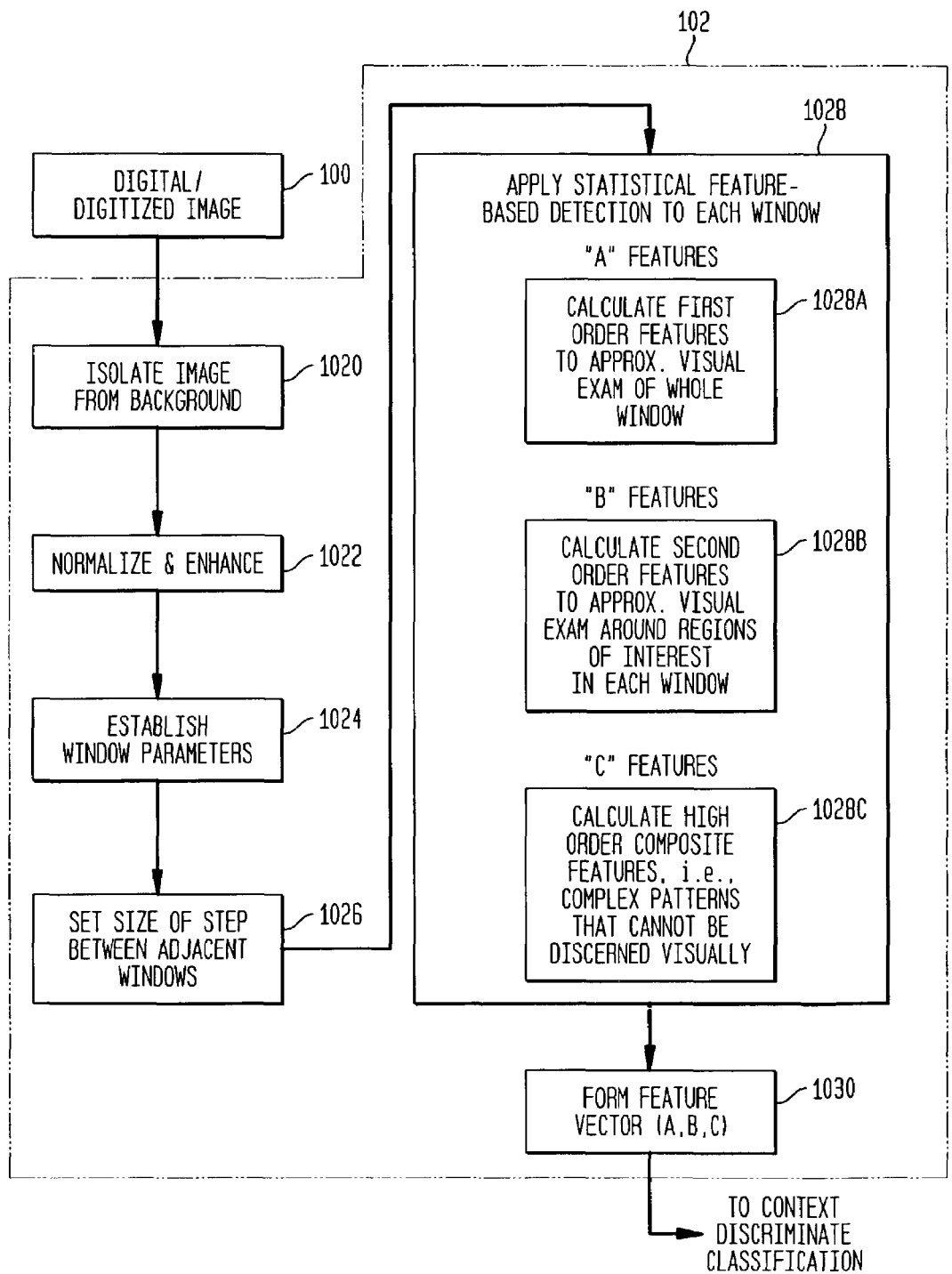
FIG. 3 is a flow diagram depicting a feature-based detection scheme in accordance with the present invention.

Detailed steps of detection algorithm preprocessing 102 in accordance with the present invention are presented in FIG. 3. After the digital or digitized image 100 has been acquired, relevant subject matter is isolated from extraneous background at step 1020. The particular method used to eliminate such background is not a limitation of the present invention. By way of example, one approach for accomplishing step 1020 is disclosed in U.S. Pat. No. 6,381,352, entitled "Method of Isolating Relevant Subject Matter in an Image," the contents of which are hereby incorporated by reference.

The relevant subject matter of the image is pre-processed at step 1022 so that subsequent detection and (context discriminate) classification stages are robust with respect to variations in background intensity levels. Accordingly, step 1022 normalizes the image by re-mapping the relevant subject matter. Depending on the application, re-mapping can include specific range mapping. For example, in terms of a mammogram, data below a selected minimum grey level is mapped to 0, data above a selected maximum grey level is mapped to 1, and data between these grey levels is re-mapped to the grey level limits such as 0–255 in a 256-bit grey level scale that can be represented by an 8-bit character. Stretching the re-mapped image to the range of grey levels available for processing (e.g., 0–255 for 256-bit grey level scale) completes the normalization process. The normalized image can then be enhanced using one or more of a variety of image enhancement schemes such as byte-scaling or contrast enhancement, background normalization, binary and grey scale Sobel filtering, Laplacian filtering, weighted median filtering, edge enhancement, contrast-dependent peak noise removal, standard deviation transformation variance and fractal transformation.

As mentioned above, feature sets are determined by preprocessing 102 for each overlapping windowed portions of image 100A such as windows 111, 112, 113, etc. The size of these windows is established by the user at step 1024. Window size is based on the size of targets of interest. Tradeoffs between target resolution and computation speed must be considered. If the target window is too big, small targets may be missed. However, if the target window is too small, processing speed is slowed and many false targets can be generated.

The user can also set the size of the step (or overlap) between adjacent windows at step 1026. For example, if many targets in an image are expected (or if a particular window has achieved a high target score), the size of the step can be reduced. If fewer or large targets are expected (or if a particular window has achieved a low target score), the size of the step can be increased to improve processing speed. Still further, step 1026 could be programmed to provide for different sized steps for different areas or quadrants of image area 100A. This could be used for images that have known image structures as is the case with mammograms.

At step 1028, a statistical feature-based detection scheme is applied to each of windows 111, 112, 113, etc. In general, step 1028 calculates the following three types of features:
  i) "A" features (step 1028A) that mimic or approximate a (human) visual examination of the image appearing in the window,
  ii) "B" features (step 1028B) that mimic or approximate a (human) visual examination around any regions of interest appearing in the window, and
  iii) "C" features (step 1028C) having complex patterns of intensities too complex for human visualization. The resulting A, B and C features for each window are used to form the feature sets at step 1030, e.g., $F_{111}$, $F_{112}$, $F_{113}$, etc.

The "A" features that mimic a visual examination of the image in a window are generally first order statistical features that are independent measures such as maximum intensity, minimum intensity, average intensity, median intensity and fractal dimension of the target window.

The "B" features that mimic a visual examination around regions of interest in each window are second order statistical features that are dependent on more than one measure like the difference between the maximum and minimum intensities or the histogram formed for each target window. Each histogram is a series "bins" used to count the occurrence or frequency of the criteria defined by a particular bin. For example, an intensity histogram could have bins associated with different intensity ranges, e.g., Bin 1=number of pixels having a grey level intensity from 0–50, Bin 2=number of pixels having a grey level intensity from 51–75, etc. The number of bins used and their associated intensity ranges is application specific and is, therefore, not to be considered a limitation of the present invention. Depending on the application and/or type of target of interest, the histograms for a window can be compared to histograms for the whole image. The histograms can also be used to calculate scores that may be indicative of the presence of a target in a window. Scoring routines can be developed for particular application.

The "C" or composite features are indicative of combinations (e.g., sums, differences, etc.) of the "A" and "B" features, or other higher order features. The particular combinations of the "A" and "B" (or other higher order) can be arrived at through empirical testing for a particular application. Accordingly, it is to be understood that the particular combinations are not a limitation of the present invention.

Referring again to FIG. 1, the feature sets provided by preprocessing 102 are input to system 10 which includes a processing section 12 and an output section 14. Briefly, processing section 12 uses the feature sets to classify targets of interest by applying the context discriminate classification of the present invention. The classified targets are identified for a user at input section 14 which can be realized by one or more of an image display, audio device(s) and a printer.

Figure 4:
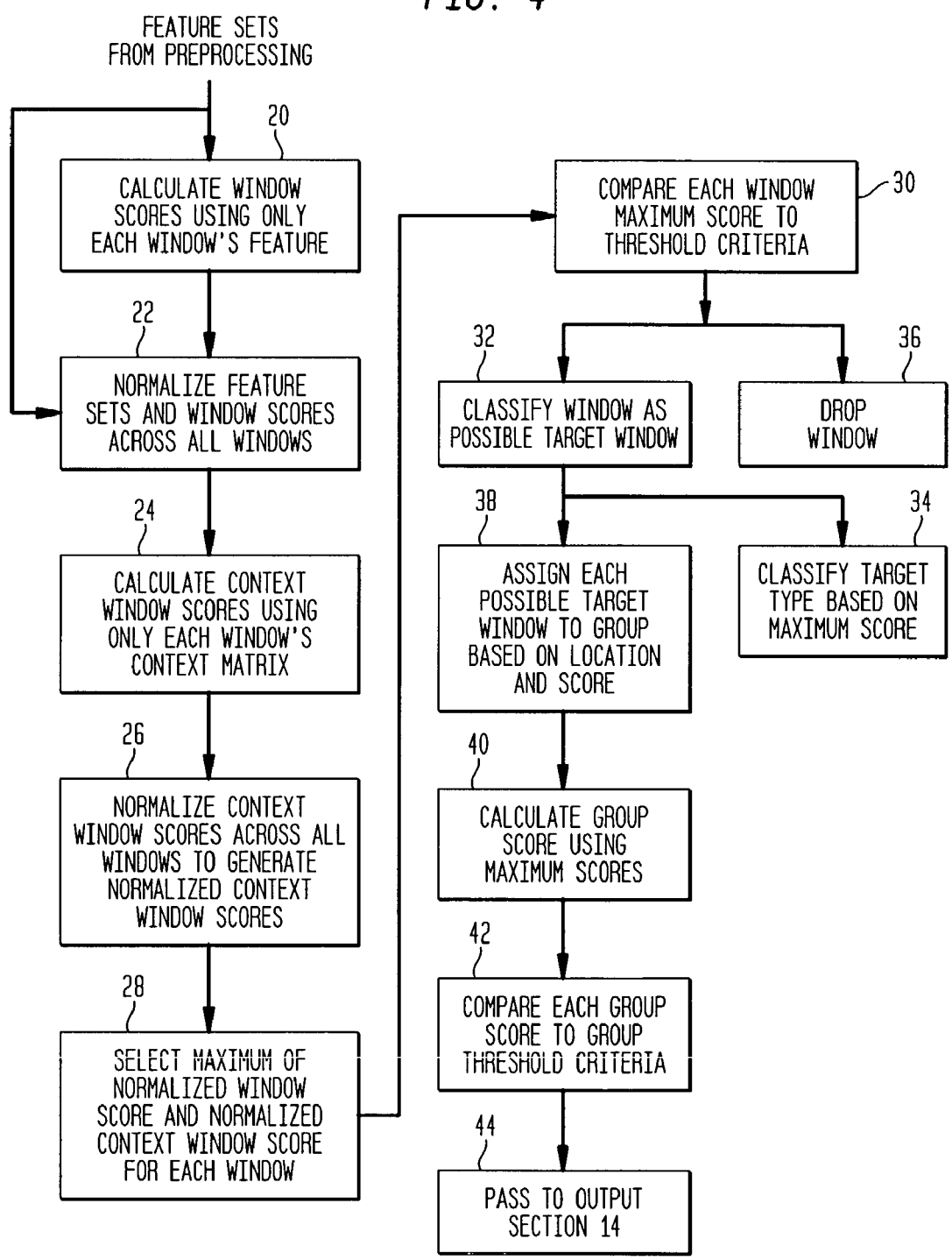
FIG. 4 is a flow diagram depicting the context discriminate classification in accordance with the present invention.

Referring now to FIG. 4, details of the context discriminate classification scheme are illustrated in flow chart form. The feature sets generated at preprocessing 102 are first used at step 20 to calculate individual window scores (e.g., $W_{111}, W_{112}, W_{113}$, etc. in the illustrated example) that are based solely on the feature values associated with the individual window. One type of window score that could be used is a weighted sum of the window's feature values with each feature $f_n$ being assigned a weight value $w_n$ depending on the particular application. For example, one application might give a greater weight value to standard deviation and maximum intensity than to skew. Applying this approach would yield a sum for each window such as $$W_{111} = \Sigma(w_1 F_{111}(f_1) + w_2 F_{111}(f_2) + \ldots + w_N F_{111}(f_N))$$

Similar window scores can be formed for each of the other windowed portions of image area 100A. The present invention could also adjust the weight values $w_n$ for a particular feature based on the feature's value. That is, rather than assigning a fixed weight value to the same feature across all of the overlapping windows, the present invention could provide for the adjustment of a particular feature's weight value predicated on the value of that feature for each window.

The window scores from step 20 and the raw feature sets from preprocessing 102 are normalized across all of the windows. Specifically, this means that the maximum value $f_{n(MAX)}$ for each feature $f_n$ and the maximum score $W_{MAX}$ from all window scores is used to normalize (i.e., make relative to a value of 1) each feature and window score. As a result, each window has a context matrix C associated therewith. For example, the context matrix $C_{111}$ for windowed portion 111 can be written as $$C_{111} = (F_{111}(f_1)/f_{1(MAX)}, \ldots, F_{111}(f_N)/f_{N(MAX)}, W_{111}/W_{MAX})$$

This assumes the minimum feature values equal zero, i.e., $f_{1(MIN)}=0, \ldots, f_{N(MIN)}=0$. Similar context matrices can be formed for each of the other windowed portions of image area 100A.

If the numbers for the particular feature were both negative and positive, one would have to find both the minimum, $f_{1(MIN)}, \ldots, f_{N(MIN)}$, and maximum, $f_{1(MAX)}, \ldots, f_{N(MAX)}$ to compute the context. Thus, in general, the context matrix $C_{111}$ for windowed portion 111 can be written as $$C_{111} = (F_{111}(f_1)/(f_{1(MAX)} - f_{1(MIN)}), \ldots, F_{111}(f_N)/(f_{N(MAX)} - f_{N(MIN)}), W_{111}/(W_{MAX} - W_{MIN}))$$

The formation of the context matrices mimics the human practice of evaluating an object/area of an image in the context of the characteristics seen in the rest of the image. Thus, the context matrix essentially ranks each feature as it relates to the same feature across all of the overlapping windows used to cover the entirety of the image area. Accordingly, the values in a context matrix range from 0 to 1.

The context matrices are next used in step 24 to calculate individual context window scores (e.g., $CW_{111}, CW_{112}, CW_{113}$, etc. in the illustrated example) that are based solely on the normalized feature values and normalized window score associated with the individual window's context matrix. For example, a context window score could simply be a sum of the values that make up the context matrix which would be written as $$CW_{111} = \Sigma(F_{111}(f_1)/f_{1(MAX)} + \ldots + F_{111}(f_N)/f_{N(MAX)} + W_{111}/W_{MAX})$$

for windowed portion 111. Similar context window scores can be formed for each of the other windowed portions of image area 100A. It is to be understood that the context window score could be calculated in ways other than a simple summation. For example, a weighted sum, or sum of subset of features that exceed some high percentage for abnormal targets could also be used without departing from the scope of the present invention. For low scoring features of abnormal targets, "one minus the feature", e.g., ($1-F_{111}$ ($f_N$)), could be included in the sum. Another example would be to count the number of context features greater than some input percentage, say 90%. This number would then be normalized.

The context window scores are then normalized across all of the windows at step 26. Specifically, this means that the maximum value $CW_{MAX}$ of all the context window scores is used to normalize each context window score. For example, the normalized context window score $NCW_{111}$ for windowed portion 111 can be written as $$NCW_{111} = CW_{111}/CW_{MAX}$$

Similar normalized context window scores can be formed for each of the other windowed portions of image area 100A.

Next, at step 28, the method identifies the maximum of the normalized context window score (NCW) and the normalized window score ($W/W_{MAX}$) for each windowed portion of image area 100A. This maximum for each window is hereinafter referred to as the maximum score MS where $MS_{111}$ is indicative of the maximum score for windowed portion 111. Each window's maximum score is compared to a threshold criteria (i.e., a selected value between 0 and 1) at step 30. For each windowed portion having its maximum score satisfy the threshold criteria, the windowed portion is identified as a possible target window (step 32) and the maximum score itself is indicative of the type of target (step 34). The "type of target" classification can be based on a database of maximum scores where the database has been trained with known target types. Should a windowed portion's maximum score fail the threshold criteria comparison in step 30, that windowed portion is dropped from further consideration/processing (step 36). For example, in the case of mammography, the type of target classification can be based on the American College of Radiologist Breast Imaging Reporting and Data System (BIRADS). Specifically, the following tissue designation ranges could be applied: "Normal" 0–79.99%, "Benign" 80–84.99%, "Probably Benign" 85–89.99%, "Suspicious" 90–94.99%, and "Very Suspicious" or "Malignant" greater than or equal to 95%. The percentages identifying targets can be modified. Other possibilities include the use of a combination of several "maximums" or an average of several maximums to generate a final maximum score that would then be compared to the same ranges described above.

Each of the so-called possible target windows identified at step 32 are next assigned to a group at step 38. In general, windows are grouped together in accordance with their location in image area 100A and the value of their maximum score. For example, windows can be grouped in accordance with a selected distance metric such as "group windows having centers separated by 50 (pixels) or less". The maximum score can be used in making the group assignment decision by grouping only those maximum scores greater or equal to a certain percentage. Forming groups by distance and score reduces the number of false target calls.

With the groups of possible target windows being formed, the method of the present invention next calculates a group score at step 40 for each group. Each group score is based on the maximum of one or several classification scores for each of the possible target windows assigned to that group. For example, one approach involves the averaging of the maximum scores across all possible target windows in the group. Another possibility is to select the median maximum score for each group. Still another possibility is to exclude the smallest and greatest maximum scores in the group and then average the remaining maximum scores. Yet another possibility is to calculate the group score from the average of three scores: the maximum score associated with the group, the average of the group, and the median of the group. The minimum score associated with the group could also be added to these three. A point system can also be devised whereby the group score is lowered based on a minimum scores for the group maximum or group standard deviation, or other group features. By the same token, the group score can be raised if the group maximum or group standard deviation reaches a high enough value. Again, groups are compared in context to the other groups. Accordingly, it is to be understood that there are many ways to form a group score that lie within the scope of the present invention.

Each group score is next compared to a group threshold criteria at step 42. Satisfaction of this criteria means that the group is considered a target with this determination being passed to output section 14 at step 44. The target classification for the group can be based on the same criteria used in step 34 for the classification of individual target windows.

The advantages of the present invention are numerous. Windowed pieces of a digital image are individually evaluated in context with the entire image. The present invention can make use of sophisticated mathematical measures of a digital image and, at the same time, analyze these measures in the context of the entire image. Thus, the present invention mechanizes the human ability to analyze a portion of an image relative to the remainder thereof.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of detecting and classifying targets in a digital image, comprising the steps of:
   generating a feature set for each of a plurality of overlapping windowed portions of said image, each feature in said feature set defined by a value indicative of a mathematical measure of a corresponding one of said plurality of overlapping windowed portions;
   forming a weighted sum for each of said plurality of overlapping windowed portions using said feature set corresponding thereto;
   normalizing each feature in said feature set and said weighted sum for each of said plurality of overlapping windowed portions across said plurality of overlapping windowed portions, wherein a context matrix is defined by a normalized feature set and a normalized weighted sum for each of said plurality of overlapping windowed portions;
   forming a score using said context matrix for each of said plurality of overlapping windowed portions;
   normalizing said score for each of said plurality of overlapping windowed portions across said plurality of overlapping windowed portions, wherein a normalized score is defined for each of said plurality of overlapping windowed portions;

comparing a threshold criteria to a maximum score defined as the maximum of said normalized weighted sum and said normalized score for each of said plurality of overlapping windowed portions, wherein each of said plurality of overlapping windowed portions having said maximum score satisfying said threshold criteria is classified as a possible target window and wherein said maximum score is indicative of a target classification;

assigning each said possible target window to a group based on location of said possible target window in said image and said maximum score associated with said possible target window;

forming a group score for each said group using said maximum score associated with each said possible target window in said group; and comparing each said group score to a group threshold criteria, wherein each said group having its corresponding said group score satisfying said group threshold criteria is classified as a target and wherein said group score is indicative of a target classification.

2. A method according to claim 1 wherein said step of forming said weighted sum includes the step of adjusting weight values for each said feature based on said value thereof.

3. A method according to claim 1 wherein said step of forming said score comprises the step of summing values in said context matrix for each of said plurality of overlapping windowed portions.

4. A method according to claim 1 wherein said step of forming said group score comprises the step of forming an average using said maximum score for each said possible target window in said group.

5. A method according to claim 1 wherein said step of forming said group score comprises the step of selecting a median from said maximum score for each said possible target window in said group.

6. A method according to claim 1 wherein said step of forming said group score comprises the steps of:
  forming an average using said maximum score for each said possible target window in said group;
  selecting a maximum from said maximum score for each said possible target window in said group;
  selecting a median from said maximum score for each said possible target window in said group; and
  calculating said group score using said average, said maximum and said median.

7. A method according to claim 1 wherein said step of forming said group score comprises the steps of:
  forming an average using said maximum score for each said possible target window in said group;
  selecting a maximum from said maximum score for each said possible target window in said group;
  selecting a minimum from said maximum score for each said possible target window in said group;
  selecting a median from said maximum score for each said possible target window in said group; and
  calculating said group score using said average, said maximum, said minimum and said median.

8. A method according to claim 1 wherein each said feature set associated with a corresponding one of said plurality of overlapping windowed portions includes first order statistical features associated with said corresponding one of said plurality of overlapping windowed portions, second order statistical features associated with said corresponding one of said plurality of overlapping windowed portions, and combinations of said first order statistical features and said second order statistical features associated with said corresponding one of said plurality of overlapping windowed portions.

9. A system for detecting and classifying targets in a digital image, comprising:
  means for generating a feature set for each of a plurality of overlapping windowed portions of said image, each feature in said feature set being defined by a value indicative of a mathematical measure of a corresponding one of said plurality of overlapping windowed portions;
  a processor for
  i) forming a weighted sum for each of said plurality of overlapping windowed portions using said feature set corresponding thereto,
  ii) normalizing each feature in said feature set and said weighted sum for each of said plurality of overlapping windowed portions across said plurality of overlapping windowed portions, wherein a context matrix is defined by a normalized feature set and a normalized weighted sum for each of said plurality of overlapping windowed portions,
  iii) forming a score using said context matrix for each of said plurality of overlapping windowed portions,
  iv) normalizing said score for each of said plurality of overlapping windowed portions across said plurality of overlapping windowed portions, wherein a normalized score is defined for each of said plurality of overlapping windowed portions,
  v) comparing a threshold criteria to a maximum score defined as the maximum of said normalized weighted sum and said normalized score for each of said plurality of overlapping windowed portions, wherein each of said plurality of overlapping windowed portions having said maximum score satisfying said threshold criteria is classified as a possible target window and wherein said maximum score is indicative of a target classification,
  vi) assigning each said possible target window to a group based on location of said possible target window in said image and said maximum score associated with said possible target window,
  vii) forming a group score for each said group using said maximum score associated with each said possible target window in said group, and
  viii) comparing each said group score to a group threshold criteria, wherein each said group having its corresponding said group score satisfying said group threshold criteria is classified as a target and wherein said group score is indicative of a target classification; and
  at least one output device coupled to said processor for providing an indication that said group score satisfies said group threshold criteria.

10. A system as in claim 9 wherein said at least one output device is selected from the group consisting of an image display, a printer and an audio device.

11. A system as in claim 9 wherein said processor further adjusts weight values used in said weighted sum in accordance with said value of each said feature.

12. A system as in claim 9 wherein said processor forms said score by summing values in said context matrix for each of said plurality of overlapping windowed portions.

13. A system as in claim 9 wherein said processor forms said group score by forming an average using said maximum score for each said possible target window in said group.

14. A system as in claim 9 wherein said processor forms said group score by selecting a median from said maximum score for each said possible target window in said group.

15. A system as in claim 9 wherein said processor forms said group score by forming said group score comprises the steps of:
   forming an average using said maximum score for each said possible target window in said group;
   selecting a maximum from said maximum score for each said possible target window in said group;
   selecting a median from said maximum score for each said possible target window in said group; and
   calculating said group score using said average, said maximum and said median.

16. A system as in claim 9, wherein said processor forms said group score by forming said group score comprises the steps of:
   forming an average using said maximum score for each said possible target window in said group;
   selecting a maximum from said maximum score for each said possible target window in said group;
   selecting a minimum from said maximum score for each said possible target window in said group;
   selecting a median from said maximum score for each said possible target window in said group; and
   calculating said group score using said average, said maximum, said minimum and said median.

17. A system as in claim 9 wherein said feature set associated with a corresponding one of said plurality of overlapping windowed portions includes first order statistical features associated with said corresponding one of said plurality of overlapping windowed portions, second order statistical features associated with said corresponding one of said plurality of overlapping windowed portions, and combinations of said first order statistical features and said second order statistical features associated with said corresponding one of said plurality of overlapping windowed portions.

* * * * *